2,632,364

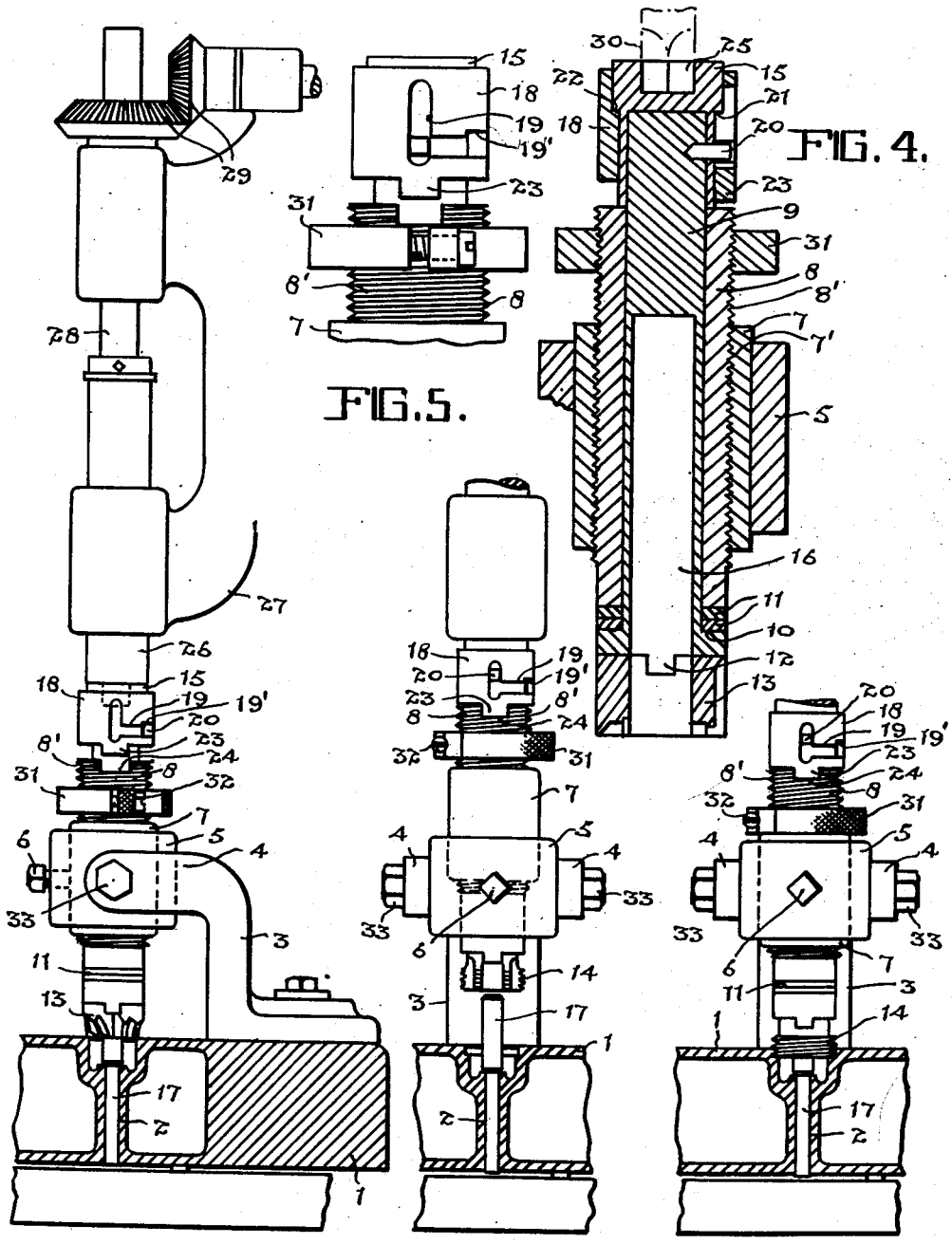
March 24, 1953 — S. C. BOYCE ET AL — 2,632,364
APPARATUS FOR INSTALLING VALVE SEATS
Filed Aug. 16, 1950
Inventors
Stanley C. Boyce
Hubert E. Hart
by Douglas S. Johnson Patented Mar. 24, 1953

UNITED STATES PATENT OFFICE 2,632,364

APPARATUS FOR INSTALLING VALVE SEATS

Stanley C. Boyce and Hubert E. Hart,
Toronto, Ontario, Canada

Application August 16, 1950, Serial No. 179,792

5 Claims. (Cl. 90—12.5)

This invention relates to improvements in apparatus for installing valve seats in cylinder heads, engine blocks or the like and the principal object of the invention is to provide an apparatus which will enable valve seats to be installed with greater facility, speed, and accuracy than with previous apparatus.

A further important object is to provide an apparatus of the type referred to which can be power or hand operated as desired, being particularly adapted for use with a drill press or the like, or such power driven equipment as available.

Another important object is to provide an apparatus eliminating contamination of the valve guide by metal cuttings formed during valve installation.

The principal feature of the invention consists in providing an apparatus consisting of an outer interiorly threaded sleeve, a lead screw in the form of an inner exteriorly threaded sleeve threaded into the outer sleeve and a tool spindle operating through the inner sleeve but held against movement longitudinally thereof, the apparatus incorporating a novel device permitting the spindle to be instantly locked to the lead screw for tapping or released therefrom for rotation therein for cutting or facing.

A further important feature consists in providing a lock ring on the lead screw by means of which the lead screw can be advanced a predetermined accurately measured distance during cutting and by means of which the lead screw advance can be accurately controlled during tapping.

Another important feature consists in mounting the outer sleeve in a bracket adjustable for accurate alignment of the spindle with the axis of the valve guide, the spindle being formed to receive a centering pilot located in the valve guide, the outer sleeve being movable in the bracket axially of the pilot permitting interchangement of the cutting and tapping tools on the spindle without removal of the pilot.

These and other objects and features will be apparent with reference to the accompanying drawings in which:

Figure 1 is an elevational view of an apparatus according to the invention showing it in position to cut the counterbore.

Figure 2 is an elevational view of the apparatus retracted from the position of Figure 1 for the replacement of the cutting tool by the tapping tool illustrated.

Figure 3 is an elevational view showing the apparatus at the completion of the tap.

Figure 4 is an enlarged mid-vertical sectional view through the apparatus.

Figure 5 is an enlarged elevational detail of the mechanism for locking the spindle to the lead screw.

In the installation of valve seats in engine blocks or the like the block is counterbored above the valve seat guide then tapped and the valve seat threaded down. It is essential that the bottom of the counterbore be true so that the valve seat upon being threaded down will jam against an accurate surface to provide maximum locking action of metal over the full area of the counterbore bottom surface and providing maximum area for heat dissipation. Therefore even when the block is preformed to have a counterbore, a cutter tool must still be used to ensure a true bottom surface before tapping is commenced.

The apparatus herein disclosed has its prime function in providing an accurate counterbore with true bottom surface and tapping the counterbore for accurately setting the valve seat with greater facility than has heretofore been possible.

Referring to the drawings, 1 represents an engine block or head which is to be provided with a valve seat above the valve guide 2.

Supported on the block 1 is a bracket 3 pivotally supporting in the fork 4 thereof a sleeve 5 provided with a clamping screw 6.

The above bracket forms a convenient means for supporting the apparatus now to be described.

Mounted in the sleeve 5 is an interiorly threaded sleeve 7 forming the outer sleeve of the apparatus and operating within the outer sleeve 7 is a lead screw 8 in the form of an exteriorly threaded sleeve, the threads 7' and 8' of the sleeves 7 and 8 corresponding in pitch to the pitch of the tapping tool to be used in providing the valve seat installation.

Operating within the lead screw 8 is tool operating spindle 9 formed with a shoulder 10 at its lower end between which and the lower end of the lead screw are arranged suitable bronze washers 11. The lower end of this spindle is formed with lug projections 12 to engage in driving connection with a cutting tool 13 shown in Figure 1 or a tapping tool 14 shown in Figures 2 and 3.

Pressed on the upper end and forming part of the spindle 9 is a head 15 which locks the spindle from movement longitudinally or axially of the lead screw and formed in the lower end of the spindle is a bore 16 to receive the pilot 17 entered into the valve guide 2 to centre the spindle and tool carried thereby.

Mounted on the head 15 of the spindle is a ring 18 formed with an L slot 19 and extending into the head and anchoring same to the spindle is a pin projection 20 projecting into the L slot.

The ring 18 is formed with an internal shoulder 21 while the head 15 is formed with an external shoulder 22 limiting upward movement of the ring to a position with the pin 20 extending into the notch 19' of the lateral portion of the slot 19.

Formed on the bottom periphery of the ring 18 are diametrically disposed lugs 23 adapted to engage in corresponding notches 24 in their upper peripheral wall of the lead screw with the pin 20 registering with and entering the upwardly extending portion of the slot 19.

The upper end of the spindle head 15 is provided with a socket opening 25 which is adapted to be engaged by a power spindle such as the spindle 26 of a drill press 27 or other power device. In the instance illustrated, Figure 1 shows the spindle 26 as being operated from a vertical drive shaft 28 through the bevel gears 29.

As illustrated in Figure 4 the end 30 of the spindle 26 may be conveniently shaped to fit the socket 25.

It will be appreciated that while the spindle 9 is adapted particularly for connection with a power drive it may be readily operated by hand or by means of a ratchet wrench or the like.

Mounted on the lead screw 8 is a threaded split ring 31 which can be contracted by the tangential screw 32 to grip the lead screw in adjusted positions.

In operation of the device the bracket 3 is located to place the spindle 9 in axial alignment with the pilot 17 received in the bore 16. The bracket sleeve 5 is locked in position by the bolts 33 and clamping screw 6 is tightened to lock the outer sleeve 7 of the valve seat installing apparatus with the cutting tool 13 secured to the spindle 9. The threaded ring 31 is run up on the lead screw 8 above the outer sleeve 7 corresponding to the desired depth of the counterbore and then locked. The ring 18 is turned to locate the pin 20 in the lateral notched portion 19' of the slot 19 as shown in Figure 1. The spindle 9 is then operated and as boring proceeds it is fed downwardly by turning the ring 31 advancing the lead screw until further advance is stopped by the sleeve 7. The clamp screws 6 may then be loosened either before or after the lead screw has been run back to its initial position in relation to its outer sleeve 7 and the whole unit may be slid up in the bracket sleeve clear of the pilot 17 to effect replacement of the cutting tool 13 by the tapping tool 14 as shown in Figure 2.

The apparatus is then reset downwardly with the ring 31 again in position to limit downward feed of the spindle 9. For tapping the ring 18 is rotated to bring the pin projection 20 into alignment with the upward extending portion of the L slot 19 to bring the lugs 23 into engagement with the notches 24. The spindle is thus locked to the lead screw 8 and as the pitch of thread between the lead screw 8 and outer sleeve 7 are identical with the tapping tool 14 rotation of the spindle 9 causes the lead screw 8 to advance the spindle downwardly at the pitch of the tapping tool.

The conversion from cutting to tapping is extremely simple by merely manipulating the ring 18 and the apparatus through a power drive will provide an accurately bored and tapped counterbore for the reception of a threaded valve seat which will seat securely against removal and enter the counterbore shoulder 34.

It will be understood that an apparatus such as described, permitting of power driving will not only provide an extremely accurate tap counterbore for ensuring positive seating of the valve but will also greatly facilitate the speed and ease of valve seat installation.

What we claim as our invention is:

1. In an apparatus for installing valve seats, an outer interiorly threaded sleeve, a lead screw in the form of an inner exteriorly threaded sleeve within and in threaded engagement with said outer sleeve and formed with a notched upper end, a tool operating spindle extending through said lead screw, a ring mounted on said spindle and formed with an L slot, having an upright portion and a peripherally extending portion, a pin rigidly connected with and projecting from said spindle extending into said slot and lug means carried by said ring and adapted to enter the notched upper end of said lead screw with said ring rotated to introduce said pin projection into the upright portion of said L slot to form a rigid positive connection between said lead screw and said spindle, said ring upon being moved to bring said lug means clear of said notched upper end freeing said spindle for rotation in said lead screw.

2. In an apparatus for installing valve seats, an outer interiorly threaded sleeve, a lead screw in the form of an inner exteriorly threaded sleeve within and in threaded engagement with said outer sleeve, a tool operating spindle arranged within said lead screw, means maintaining said lead screw and spindle against relative longitudinal movement, a ring mounted on said spindle above said lead screw and formed with an L-shaped slot formation comprising a vertical slot portion, and a horizontal slot portion communicating with the bottom of the vertical slot portion, a pin fixedly secured to and projecting from said spindle and entered in said slot formation, the lower edge of said ring and the upper edge of said lead screw being formed with inter-engaging parts adapted to inter-engage and fixedly connect said spindle to said lead screw with said pin engaging in the vertical slot portion and to move clear of engagement with said pin entered into said horizontal slot portion to free said spindle from said lead screw.

3. A device as claimed in claim 2, in which said horizontal slot portion has an offset notch to receive said pin when cleared from said vertical slot to anchor said ring against rotation with said inter-engaging parts clear of engagement.

4. An apparatus for installing valve seats in an engine block comprising a bracket adapted to be rigidly attached to said engine block, a mounting ring carried by said bracket and adapted to be positioned in axial alignment with a valve orifice of said engine block, a tubular lead screw carried threadably for axial movement in said mounting ring, means for turning said lead screw, a spindle carried rotatably in said lead screw but secured against longitudinal movement therein, a cutting tool attached to one end of said spindle, means for rotating said spindle, and a coupling sleeve carried slidably on said spindle outside of said lead screw, said coupling sleeve having lugs adapted by the movement of said sleeve to be moved to and from engagement with notches formed in the adjacent end of said lead screw, and means for securing said sleeve rigidly against rotation on said spindle when said sleeve is in its engaged position.

5. An apparatus for installing valve seats in an engine block comprising a bracket adapted to be rigidly attached to said engine block, a mounting ring carried by said bracket and adapted to be positioned in axial alignment with a valve orifice of said engine block, a tubular lead screw carried threadably for axial movement in said mounting ring, means for turning said lead screw, a spindle carried rotatably in said lead screw but secured against longitudinal movement therein, a cutting tool attached to one end of said spindle, means for rotating said spindle, a coupling sleeve carried slidably on said spindle outside of said lead screw, said coupling sleeve and lead screw having mutually co-operating means rigid therewith to lock said sleeve to said lead screw with the sleeve in one position on said spindle and to free the sleeve from the lead screw with the sleeve moved to another position on the spindle, and means for securing said sleeve rigidly against rotation on said spindle when said sleeve is in its engaged position.

STANLEY C. BOYCE.
HUBERT E. HART.

REFERENCES CITED

The following references are of record in the file of this patent:

UNITED STATES PATENTS

| Number | Name | Date |
|---|---|---|
| 598,662 | Huxley | Feb. 8, 1898 |
| 1,392,585 | Lindholm | Oct. 4, 1921 |
| 1,905,819 | Doyle | Apr. 25, 1933 |
| 2,066,136 | Burston | Dec. 29, 1936 |
| 2,480,307 | Santro | Aug. 30, 1949 |

FOREIGN PATENTS

| Number | Country | Date |
|---|---|---|
| 383,550 | Great Britain | Nov. 17, 1932 |
| 420,121 | Great Britain | Nov. 26, 1934 |